(12) United States Patent
Houghton et al.

(10) Patent No.: US 9,296,572 B2
(45) Date of Patent: Mar. 29, 2016

(54) NOSE CONE FOR DUST CONTROL

(71) Applicant: Associated Research—EDC Ltd, Calgary (CA)

(72) Inventors: Gordon Gerald Houghton, Red Deer (CA); Matthew Charles Templeton, Calgary (CA)

(73) Assignee: Associated Research-EDC Ltd., Calgary (CA)

( * ) Notice: Subject to any disclaimer, the term of this patent is extended or adjusted under 35 U.S.C. 154(b) by 0 days.

(21) Appl. No.: 14/666,291

(22) Filed: Mar. 23, 2015

(65) Prior Publication Data

US 2015/0284183 A1   Oct. 8, 2015

Related U.S. Application Data

(60) Provisional application No. 61/975,511, filed on Apr. 4, 2014.

(51) Int. Cl.
*B65G 19/28* (2006.01)
*B65G 69/18* (2006.01)

(52) U.S. Cl.
CPC .................................. *B65G 69/186* (2013.01)

(58) Field of Classification Search
CPC ........ B65G 21/08; B65G 69/186; B08B 5/04; B08B 15/007; B08B 15/02; B60P 1/36
USPC ................ 198/493, 494, 860.1, 860.3, 735.3, 198/735.5, 860.5; 134/104.2, 133; 15/301, 15/300.1, 314
See application file for complete search history.

(56) References Cited

U.S. PATENT DOCUMENTS

| | | | |
|---|---|---|---|
| 4,029,890 A | 6/1977 | Nakata | |
| 4,439,211 A * | 3/1984 | Anderson | A23L 1/1025 134/25.1 |
| 5,052,451 A * | 10/1991 | Gentilcore | B65B 1/28 141/286 |
| 5,651,147 A | 7/1997 | Steele et al. | |
| 5,720,660 A | 2/1998 | Benedetto et al. | |
| 6,415,909 B1* | 7/2002 | Mitchell | B65G 19/14 198/550.1 |
| 6,746,500 B1 | 6/2004 | Park et al. | |
| 7,789,217 B2* | 9/2010 | Fischer | B65G 47/19 198/525 |
| 8,562,720 B2 | 10/2013 | Stutzman et al. | |
| 8,636,832 B2 | 1/2014 | Stutzman et al. | |
| 8,864,953 B2 | 10/2014 | Gutsol et al. | |
| 8,881,749 B1 | 11/2014 | Smith | |
| 2009/0152073 A1* | 6/2009 | Fischer | B65G 69/181 198/523 |
| 2012/0090956 A1* | 4/2012 | Brobst | B65G 69/181 198/525 |
| 2012/0247335 A1 | 10/2012 | Stutzman et al. | |
| 2013/0309052 A1* | 11/2013 | Luharuka | B65G 3/04 414/291 |
| 2015/0135636 A1* | 5/2015 | Ayres | B07B 15/00 52/745.03 |

* cited by examiner

*Primary Examiner* — James R Bidwell
(74) *Attorney, Agent, or Firm* — Law Office of Karen Dana Oster, LLC

(57) ABSTRACT

Preferred nose cones 100 associatable with a tail spout 120 of a sand handler and a vacuum hose 130 of a vacuum system are described herein. A method for containing respirable and/or inhalable particles 140 created in an industrial process is also disclosed herein.

18 Claims, 12 Drawing Sheets

NOSE CONE FOR DUST CONTROL

The present application is an application claiming the benefit of U.S. Provisional Patent Application No. 61/975,511, filed Apr. 4, 2014. The present application is based on and claims priority from this application, the disclosure of which is hereby expressly incorporated herein by reference in its entirety.

BACKGROUND OF THE INVENTION

Described herein is a nose cone with a viewing window and, more specifically, a nose cone with a viewing window being associatable with a tail spout of a sand handler and a vacuum hose of a vacuum system.

Inhalable and/or respirable silica dioxide ($SiO_2$) is a major problem facing the oil and gas (O&G) industry. Silica dioxide is a commonly occurring element found in two forms—crystalline and amorphous. Quartz and sand are common examples of crystalline silica. Silica dioxide is particularly hazardous when it is broken down, creating inhalable or respirable silica dust (very small crystalline particles and/or amorphous particles). The Center for Construction Research and Training has stated that "inhaling crystalline silica dust can lead to silicosis, bronchitis, or cancer as the dust becomes lodged in the lungs and continuously irritates them." According to the World Health Organization (WHO), whenever people inhale airborne dust at work, they are at risk of occupational disease. Year after year, both in developed and in developing countries, overexposure to dusts causes disease, temporary and permanent disabilities and deaths. Dusts in the workplace may also contaminate or reduce the quality of products, be the cause of fire and explosion, and damage the environment.

Hydraulic fracturing (fracking) is a process used to stimulate the flow of natural gas or oil so as to increase the volume (in some cases, by many hundreds of percent) and the rate at which natural gas or oil can be recovered from reservoir formations. Hydraulic fracturing actually occurs after a well hole (wellbore) is drilled. Sometimes the drilled hole is an existing oil and gas well. Hydraulic fracturing pumps large quantities of hydraulic fracturing fluid (which may include, for example, water, proppant, and chemicals) to create or restore small fractures (paths). The proppants (also referred to as "frac sand" or "industrial sand") fracture rock so that shale gas (natural gas in shale), tight gas (natural gas in sandstone or limestone), tight oil (crude oil in shale or sandstone), and/or coal seam gas (natural gas in coal beds) can be extracted. The proppants also hold open the newly created fractures. As the proppants are used in the fracking process, they begin to at least partially breakdown into smaller particles. Further, the proppants tend to breakdown during handling (loading, transportation, and unloading). The breakdown of the proppants results in respirable silica. Respirable silica has recently been recognized as a hazard in fracking operations, which can use between several tons to two million pounds of frac sand per well site.

To reduce the hazard of respirable silica, the common practice for controlling silica dust contamination is to create a large tent structure around a "transfer belt" (t-belt) with openings for a "dragon tail" (the top of the end of the transfer belt) of one or more "sand handlers" (e.g. sand hogs, sand kings, sand bass, and mountain movers). One or more vacuum hoses are then introduced into the tent structure, facing towards the location of the sand stream coming from the tail spout. The vacuum hose has to be laid correctly or problems may ensue. If the vacuum hose is placed too close to the frac sand, the hose can end up sucking up sand. If the vacuum hose is placed too far away from the frac sand, the hose does not effectively remove the silica dust.

Another problem is that the tent structure can block the operator's sightlines. Even if an opening is made in the tent structure so that the operator can see what is going on inside the tent structure, the interior of the tent structure can be dark making it difficult to see. If the tent structure is preventing the operators from seeing what they're doing, it is difficult for the operators to make adjustments to the rate of sand transfer which is critical to the fracturing process. Adding a window to the tent structure to regain sightlines is impractical for a number of reasons. An open window will necessarily allow dust to escape because the overall volume of air within the tent is too large for the vacuum hoses to maintain sufficient negative pressure. Adding a pane of transparent material to the window to contain the dust fails as the window becomes too dirty to see through. This design often requires that a plurality of vacuum hoses be run along the ground to reach the appropriate spots, which presents a tripping hazard. Also, if a vacuum hose is not well fixed to its final location, it may shift out of place. If the tent material is loose, it may be accidentally sucked into the vacuum hose.

Tent structures can be large and cumbersome. The full tent structure requires a large setup and tear-down procedure for every job. It is not road worthy, and therefore cannot be left on the equipment. The tent structures are not particularly good at adjusting to changes in the height or position of the tail. Further, the tent structure may not contain the silica dust at the opening of the tail (e.g. the tail spout), especially when the tail is lifted higher than the top of the tent structure (which occasionally happens). By creating a large volume space with very high concentrations of silica dust, a health hazard is created if a worker must enter the area to deal with a problem.

U.S. Patent Publication No. 2012/0247335 to Stutzman et al. concerns a method of reducing silicosis caused by the inhalation of silica-containing proppant, such as silica sand and resin-coated sand, and an apparatus therefor.

U.S. Pat. No. 8,881,749 to Smith discusses a system and method for controlling silica dust during hydraulic fracturing operations. The Smith system includes a system of conduits having a plurality of inlets for collecting silica dust generated at selected points along a conveyor system. An air system pneumatically coupled to the system of conduits generates a negative pressure at each of the inlets to induce the collection of silica dust at the selected points along the conveyor.

BRIEF SUMMARY OF THE INVENTION

Described herein is a nose cone associatable with a tail spout of a sand handler and a vacuum hose of a vacuum system. The nose cone includes a material sheet that has an upper edge, a lower edge, a first side edge, and a second side edge. The first side edge of the material sheet at least partially overlaps the second side edge of the material sheet to form an overlap therebetween. At least part of the upper edge of the material sheet forms an open upper end of the nose cone, and at least part of the lower edge of the material sheet forms an open lower end of the nose cone. A viewing window is formed between a lower portion of the first side edge of the material sheet and a lower portion of the second side edge of the material sheet. At least one attachment mechanism secures the material sheet at or near the overlap. The open upper end of the nose cone is associatable with the tail spout and the vacuum hose to contain respirable and/or inhalable particles created in an industrial process.

The material sheet may be wrapped conically. The open upper end has an upper diameter and the open lower end has a lower diameter. Preferably, the upper diameter is smaller than the lower diameter. Preferably, the material sheet is at least semitransparent, transparent, and/or disposable. The at least one attachment mechanism may be selected from the group consisting of cable ties, fasteners, adjustable connectors, and adhesives.

Also described herein is a nose cone associatable with a tail spout of a sand handler and a vacuum hose of a vacuum system. The nose cone includes an at least semitransparent material sheet that has an upper edge, a lower edge, a first side edge, and a second side edge. The material sheet is preferably wrapped to form a cone. The first side edge of the material sheet at least partially overlapping the second side edge of the material sheet to form an overlap therebetween. At least part of the upper edge of the material sheet forms an open upper end of the nose cone and at least part of the lower edge of the material sheet forming an open lower end of the nose cone. The open upper end has an upper diameter and the open lower end has a lower diameter, the upper diameter being smaller than the lower diameter. A generally triangular viewing window is formed between a lower portion of the first side edge of the material sheet and a lower portion of the second side edge of the material sheet. At least one attachment mechanism secures the material sheet at or near the overlap. The open upper end of the nose cone is substantially sealable with the tail spout and the vacuum hose to contain respirable and/or inhalable particles created in an industrial process. The material sheet may be transparent and/or disposable. The at least one attachment mechanism may be selected from the group consisting of cable ties, fasteners, adjustable connectors, and adhesives.

Also disclosed herein is a method for containing respirable and/or inhalable particles created in an industrial process. The method includes the steps of creating a nose cone, forming a viewing window, securing the material sheet, and securing the open upper end of the nose cone with a tail spout and a vacuum hose. The step of creating a nose cone includes using a material sheet (that has an upper edge, a lower edge, a first side edge, and a second side edge) to creating the nose cone by wrapping the first side edge of the material sheet to at least partially overlap the second side edge of the material sheet to form an overlap therebetween, to form an open upper end of the nose cone from at least part of the upper edge of the material sheet, and to form an open lower end of the nose cone from at least part of the lower edge of the material sheet. The step of forming a viewing window includes forming a viewing window between a lower portion of the first side edge of the material sheet and a lower portion of the second side edge of the material sheet. The step of securing the material sheet includes securing the material sheet at or near the overlap using at least one attachment mechanism. The step of securing the open upper end of the nose cone with a tail spout and a vacuum hose is performed to contain respirable and/or inhalable particles created in an industrial process.

The step of creating a nose cone may further include the step of conically wrapping the first side edge of the material sheet to at least partially overlap the second side edge of the material sheet to form the overlap therebetween. The step of creating a nose cone may further include the step of wrapping the upper edge of the material sheet around an outer joint circumference of both the tail spout and the vacuum hose. The step of creating a nose cone may further include the step of wrapping the upper edge of the material sheet so that the open upper end has an upper diameter and the open lower end has a lower diameter, the upper diameter being smaller than the lower diameter. The step of securing the open upper end of the nose cone may further include the step of securing the open upper end of the nose cone with the tail spout and the vacuum hose using at least one attachment mechanism selected from the group consisting of cable ties, fasteners, adjustable connectors, and adhesives. The open lower end of the nose cone may also be trimmed. At least one additional window may be cut in the material sheet of the nose cone.

The subject matter described herein is particularly pointed out and distinctly claimed in the concluding portion of this specification. Objectives, features, combinations, and advantages described and implied herein will be more readily understood upon consideration of the following detailed description of the invention, taken in conjunction with the accompanying drawings.

BRIEF DESCRIPTION OF THE SEVERAL VIEWS OF THE DRAWINGS

The accompanying drawings illustrate various exemplary nose cones and/or provide teachings by which the various exemplary nose cones are more readily understood.

Figure 1:
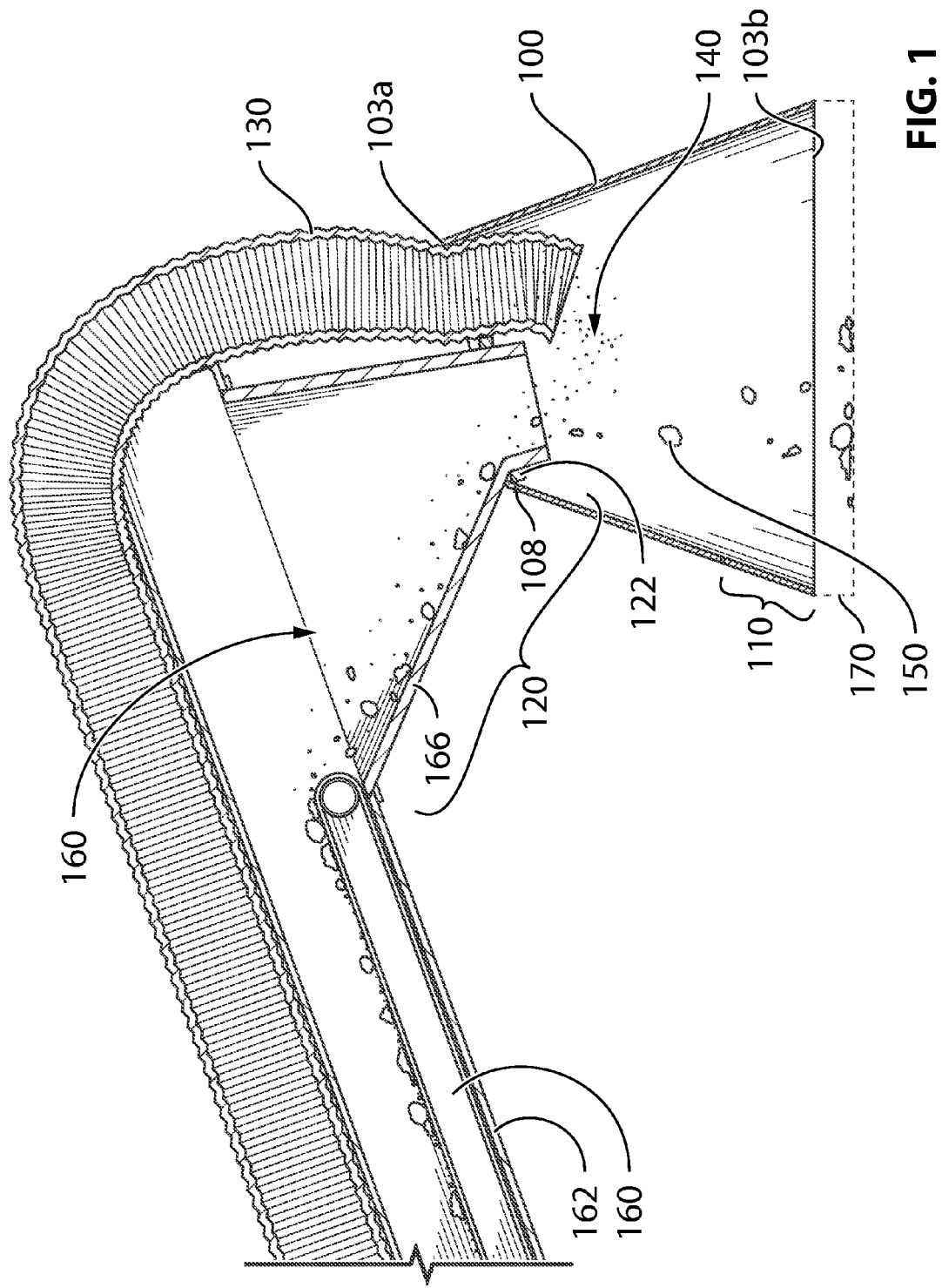
FIG. 1 is a cross-sectional view of a preferred exemplary nose cone with a viewing window, the nose cone in substantially sealed association with a tail spout of a sand handler and a vacuum hose of a vacuum system.
Figure 2:
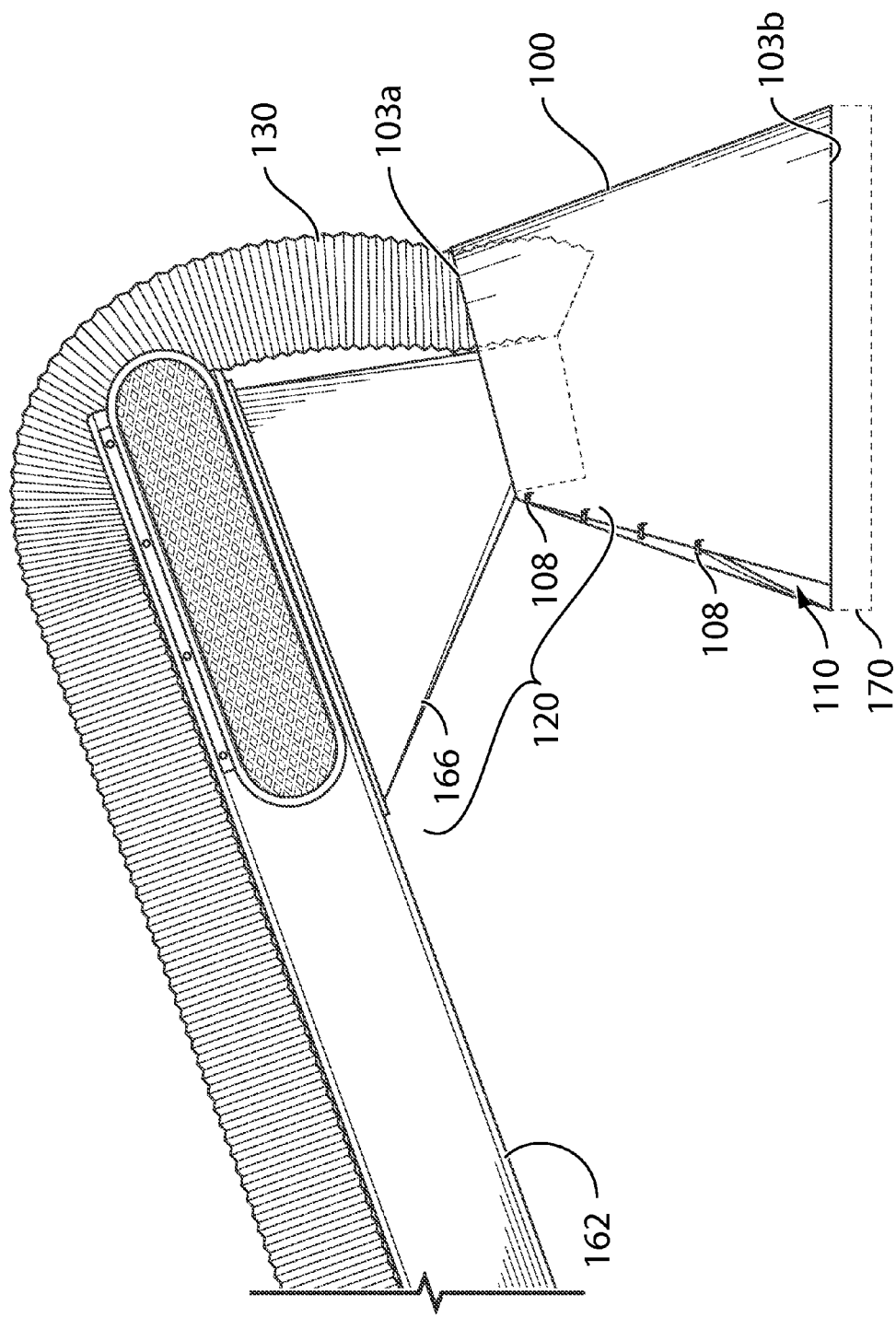
FIG. 2 is a side view of a preferred exemplary nose cone with a viewing window, the nose cone in substantially sealed association with a tail spout of a sand handler and a vacuum hose of a vacuum system.
Figure 3:
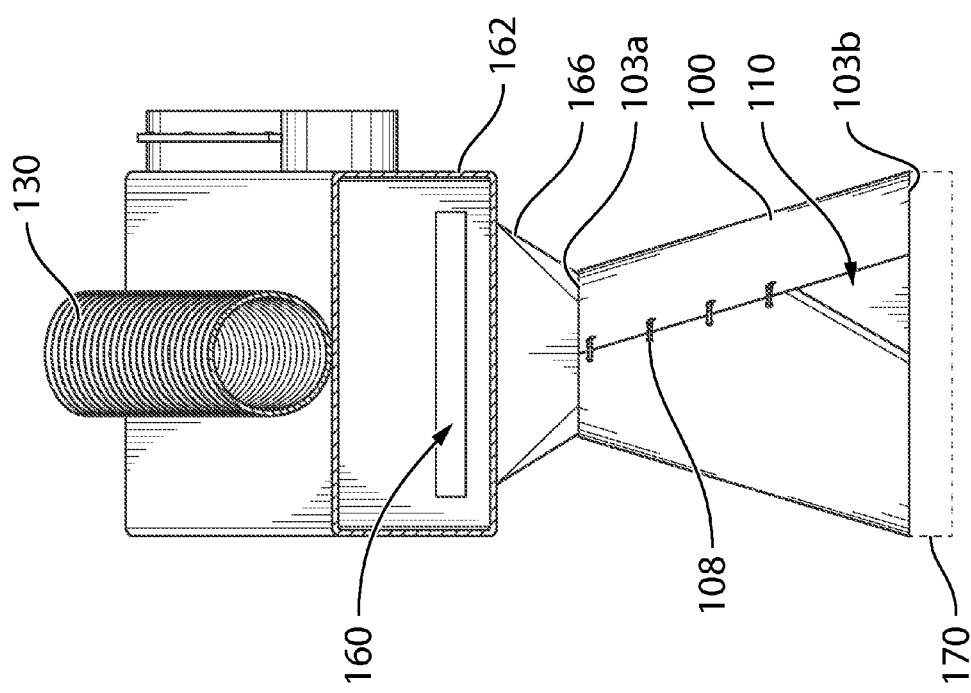
FIG. 3 is an end view of a preferred exemplary nose cone with a viewing window, the nose cone in substantially sealed association with a tail spout of a sand handler and a vacuum hose of a vacuum system.

The drawing figures are not necessarily to scale. Certain features or components herein may be shown in somewhat schematic form and some details of conventional elements may not be shown or described in the interest of clarity and conciseness. The drawing figures are hereby incorporated in and constitute a part of this specification.

DETAILED DESCRIPTION OF THE INVENTION

Described herein is a nose cone 100 with a viewing window 110 and, more specifically, a nose cone 100 with a viewing window 110 being associatable with a tail spout 120 of a sand handler (not shown) and a vacuum hose 130 of a vacuum system (not shown). The nose cone 100 provides an efficient and effective method of containing the dust 140 (e.g. silica dust 140) and/or other dangerous respirable and/or inhalable particles created in industrial processes such as fracking.

Exemplary nose cones may be better understood with reference to the drawings, but these nose cones are not intended to be of a limiting nature. The same reference numbers will be used throughout the drawings and description in this document to refer to the same or like parts. The shown shapes and relative dimensions are preferred, but are not meant to be limiting unless specifically claimed, in which case they may limit the scope of that particular claim.

DEFINITIONS

Before describing the nose cones and the figures, some of the terminology should be clarified. Please note that the terms and phrases may have additional definitions and/or examples throughout the specification. Where otherwise not specifically defined, words, phrases, and acronyms are given their ordinary meaning in the art. The following paragraphs provide some of the definitions for terms and phrases used herein.

The phrase "silica dust 140" (also referred to as "dust," "silica," "respirable silica," and "inhalable silica") is used herein to generally include respirable and/or inhalable silica dioxide particles. The silica dust 140 may be, for example, generated from the breakdown of "silica sand 150" (also referred to as "frac sand 150"). Both silica dust 140 and silica sand 150 are shown in FIG. 1 and are enlarged significantly for the purposes of showing them. Also, only a few representative particles of silica dust 140 and a few representative granules of silica sand 150 are shown. Silica dust 140 may not be visible to the human eye or only may be visible when seen in conjunction with many particles of silica dust 140. Silica sand 150, in reality, may be, for example, between 0.1 mm and 1.0 mm in diameter. Silica or frac sand 150 may be, for example, quartz, sand, ceramic pellets, or other small incompressible particles. Further, if the nose cone described herein is used in other industries, the term "silica dust" is meant to include problematic inhalable particles and/or dust associated with those industries. The alternative dust may or may not be made of silica.

The phrase "sand handler" is being used to generally describe machines used for the handling (e.g. loading, transporting, delivering, storing, and selective unloading) of frac sand 150. Exemplary sand handlers include, but are not limited to, sand hogs, sand kings, sand bass, and mountain mover. The sand handlers have at least one "handling mechanism 160" such as transfer belts that handle (e.g. load, transport, deliver, or unload) the frac sand 150 and, in the process, create silica dust 140. The shown handling mechanism 160 has a cover or is within an enclosure 162. At the end of the handling mechanism 160 is at least one "sand exit 164" through which the frac sand 150 falls. The "sand exit 164" may be an aperture or just the end of the handling mechanism 160. A "sand exit funnel 166" may be positioned below the aperture. The sand exit 164 and/or the sand exit funnel 166 are referred to as the "tail spout 120." The tail spout 120 may have associated tail attachment structure 122 that may, for example, be an annular lip, an annular ring (secured by set screws, bolts, or welding), or individual attachment devices (e.g. loops, holes, hooks). There also may be a "throwing mechanism" (not shown) that propels the frac sand 150 and/or silica dust 140 associated with the handling mechanism 160, the sand exit 164, the sand exit funnel 166 and/or the tail spout 120.

Figure 12:
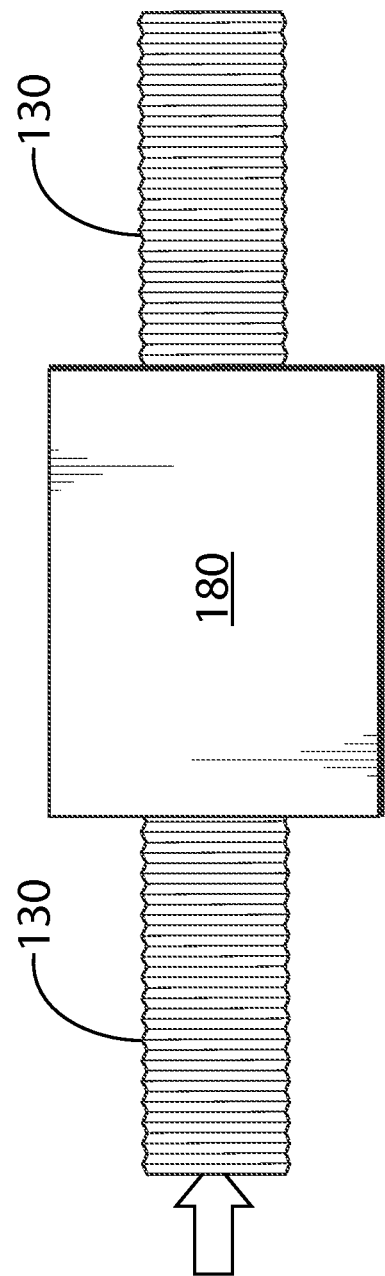
FIG. 12 is a simplified schematic view of a separation system.

The phrase "vacuum hose 130" is used to describe a conduit between a vacuum system (not shown) and the area near the tail spout 120 where the silica dust 140 and silica sand 150 exit the sand exit funnel 166. The vacuum hose 130 may be a cylindrical ribbed hose that can bend around and be held in position relative to the tail spout 120. The vacuum hose 130 may be flexible and/or compressible so that it can be partially flattened or shaped to form a seal in relation to the tail spout 120. A "vacuum entrance end" is the end of the vacuum hose 130 that is functionally associated with the tail spout 120. The vacuum entrance end includes not only the extreme opening through which the silica dust 140 enters, but also at least a few inches to a few feet of the hose immediately adjacent thereto. The vacuum system may include a separation system 180 (FIG. 12) to separate heavy particles from the dusty air. The separation system 180 may include filters, a vortex chamber, and/or a "trap" to accomplish this purpose. A vortex chamber (not shown) might be positioned inline with the vacuum hose such that the dusty air enters the vortex chamber and the heaviest particles are removed before the air continues out the top of the vortex chamber. A trap (or right angle bend) functions by slowing the air momentarily at the bend allowing larger solids to drop from the air flow. Exemplary structure that could be adapted to function as a separation system 180 include, but are not limited to, systems described in U.S. Pat. No. 4,029,890 to Nakata, U.S. Pat. No. 5,651,147 to Steele et al., U.S. Pat. No. 6,746,500 to Park et al., and U.S. Pat. No. 8,864,953 to Gutsol et al.

The term "associated" (and variations thereof) is defined to mean integral or original, retrofitted, attached, connected (including functionally connected), positioned near, and/or accessible by. Particular associations may be modified to be more specific. For example, a vacuum hose 130 that is "functionally associated" with a tail spout 120 to collect silica dust 140 emitted therefrom would be positioned in such a way to fulfill its stated function. Similarly, a nose cone 100 that is in a "substantially sealed association" with a tail spout 120 would most likely not be distal from the tail spout 120 because it would be difficult to meet the "substantially sealed" characteristic of the specified association if the distance was great.

It should be noted that relative terms (e.g. first and second) are meant to help in the understanding of the technology and are not meant to limit the scope of the invention. For example, the "first side edge" has no order relationship with the "second side edge" and the terms "first" and "second" are meant solely for purposes of designation and not for order or limitation. Another example is that the term "upper" (used herein in relation, for example, to the "open upper end" and "upper edge") is meant to be relative to the term "lower" (used herein in relation, for example, to the "open lower end" and "lower edge").

The terms "may," "might," "can," and "could" are used to indicate alternatives and optional features and only should be construed as a limitation if specifically included in the claims. For example, the phrase "[t]he two lines of attachment mechanisms positions 104b-c may be used separately with the line of attachment mechanisms at positions 104a" indicates that the possibility is optional. It should be noted that the various components, features, steps, or embodiments thereof are all "preferred" whether or not it is specifically indicated. Claims not including a specific limitation should not be construed to include that limitation.

Unless specifically stated otherwise, the term "exemplary" is meant to indicate an example, representative, and/or illustration of a type. The term "exemplary" does not necessarily mean the best or most desired of the type. For example, the "exemplary attachment mechanisms" is just examples of attachment mechanisms, but other attachment mechanisms could be just as desirable.

It should be noted that, unless otherwise specified, the term "or" is used in its nonexclusive form (e.g. "A or B" includes A, B, A and B, or any combination thereof, but it would not have to include all of these possibilities). It should be noted that, unless otherwise specified, "and/or" is used similarly (e.g. "A and/or B" includes A, B, A and B, or any combination thereof, but it would not have to include all of these possibilities). It should be noted that, unless otherwise specified, the terms "includes" and "has" mean "comprises" (e.g. a device that includes, has, contains, or comprises A and B, but optionally may contain C or additional components other than A and B). It should be noted that, unless otherwise specified, the singular forms "a," "an," and "the" refer to one or more than one, unless the context clearly dictates otherwise.

Figure 9:
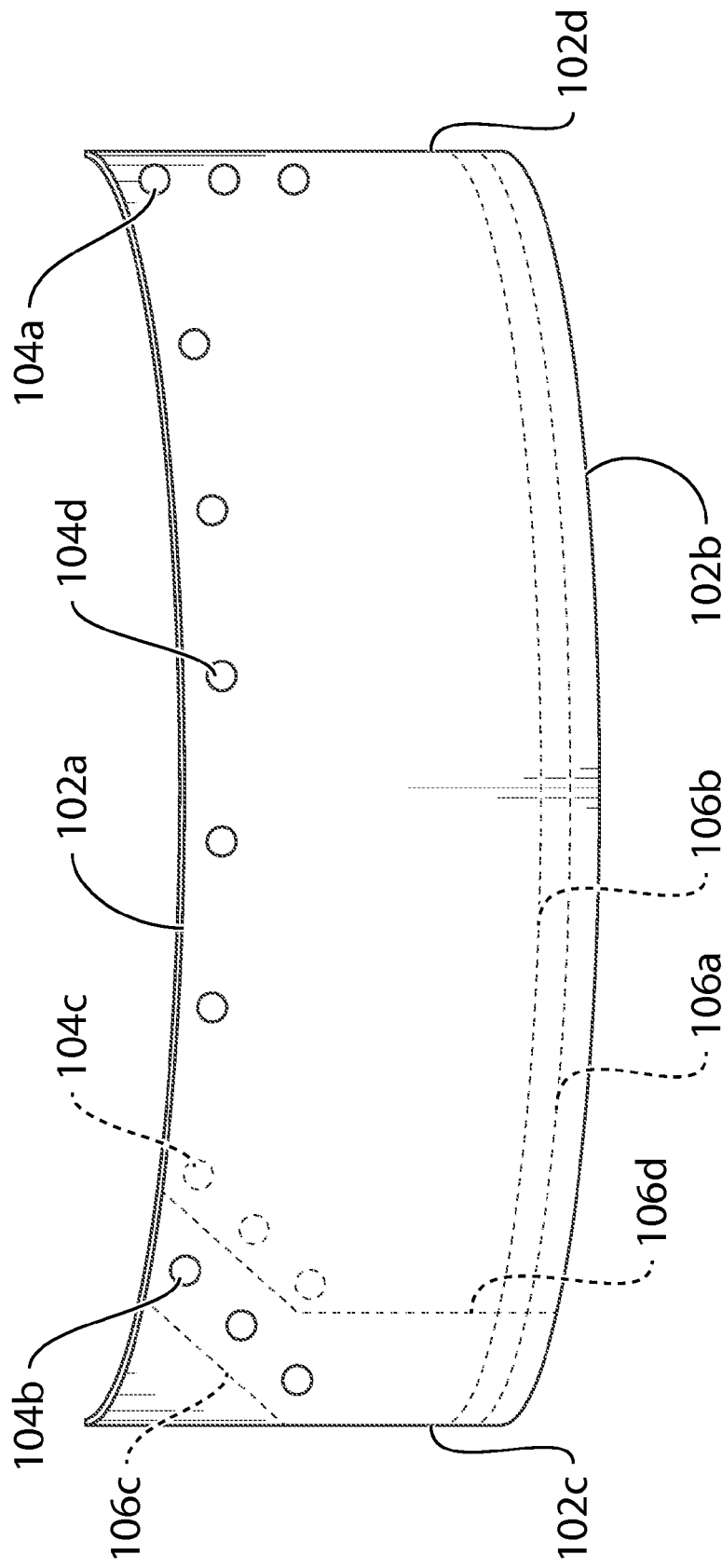
FIG. 9 is a plan view of an unassembled and uninstalled preferred exemplary nose cone with markings showing possible positions of attachment mechanisms and exemplary positions of trim lines.

Nose Cone:

The nose cone 100 described herein is made from a material sheet that has an upper edge, a lower edge, a first side edge, and a second side edge. FIG. 9 shows an exemplary material sheet that has an upper edge 102a, a lower edge 102b, a first side edge 102c, and a second side edge 102d. The shown material sheet has an arced upper edge 102a and an arced lower edge 102b, although this is not strictly necessary. The material sheet of FIG. 9 is meant to be exemplary but alternative sizes and shapes are included. For example, the height (between the upper edge 102a and the lower edge 102b) would be increased if a longer drop is (the distance between the tail and the hopper 170) anticipated. The material sheets may be custom made for a particular installation, adjustable, and/or adaptable in the field.

Figure 10:
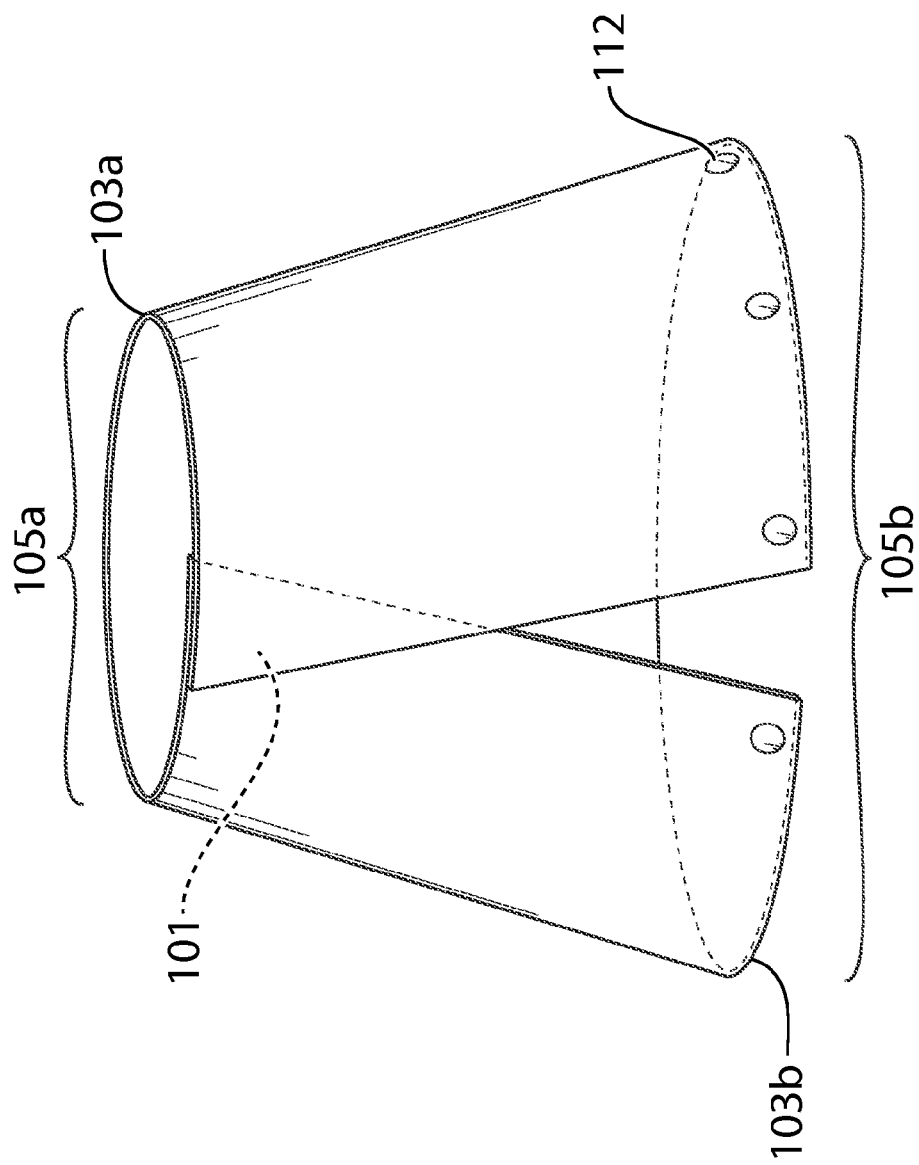
FIG. 10 is a simplified cross-sectional view of a preferred exemplary nose cone.
Figure 11:
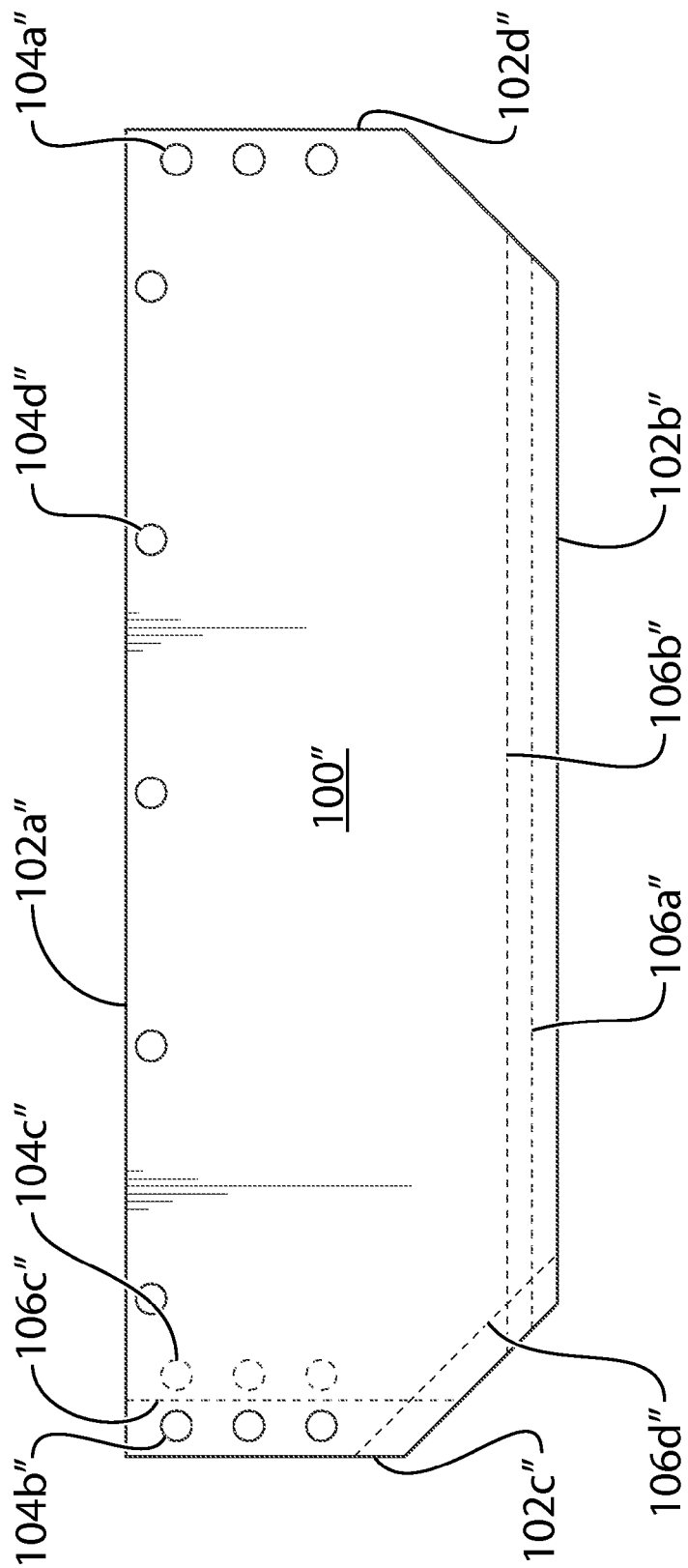
FIG. 11 is a plan view of an unassembled and uninstalled alternative preferred exemplary nose cone with markings showing possible positions of attachment mechanisms and exemplary positions of trim lines.

The material sheet is preferably wrapped cylindrically and/or conically such that it has an open upper end 103a (formed by the upper edge 102a of the material sheet) and an open lower end 103b (formed by the lower edge 102b of the material sheet). The open lower end 103b is also referred to as a "base." The open upper end 103a of the nose cone 100 preferably has an upper diameter 105a (FIG. 10). The open lower end 103b of the nose cone 100 preferably has a lower diameter 105b (FIG. 10). Preferably, the upper diameter 105a may be smaller than the lower diameter 105b. (If the diameters are consistent, the material sheet may have side edges that are notched (e.g. as shown in FIG. 11) and/or angled so that, when wrapped, the side edges still form the viewing window.) Neither the open upper end 103a nor the open lower end 103b must be perfectly level with the ground. Further, the open upper end 103a does not need to be parallel with the open lower end 103b.

The first side edge 102c is shown as partially overlapping the second side edge 102d to form an overlap 101 (FIG. 10). Preferably, at least the upper portion of the first side edge 102c overlaps at least the upper portion of the second side edge 102d. The lower portion of the first side edge 102c and the lower portion of the second side edge 102d, however, do not overlap so that a viewing window 110 (shown as being generally triangular) is formed between the lower portion of the first side edge 102c and the lower portion of the second side edge 102d. Put another way, the base of the material sheet does not form a complete circle, thereby creating an opening for both viewing (viewing window 110) and an accommodation mechanism by which extra sand 150 can be accommodated. When the opening acts as a viewing window 110 it provides an unobstructed view of the interior of the nose cone 100. Unlike a transparent material which may eventually become cloudy or scratched, the opening is always clear. When the opening acts as an accommodation mechanism, the edges of the material sheet can "splay" outward to accommodate additional sand 150. Further, if the attachment mechanisms are adjustable connectors, additional accommodation is possible as the adjustable connectors preferably allows the diameter of the nose cone 100 to expand.

Figure 4:
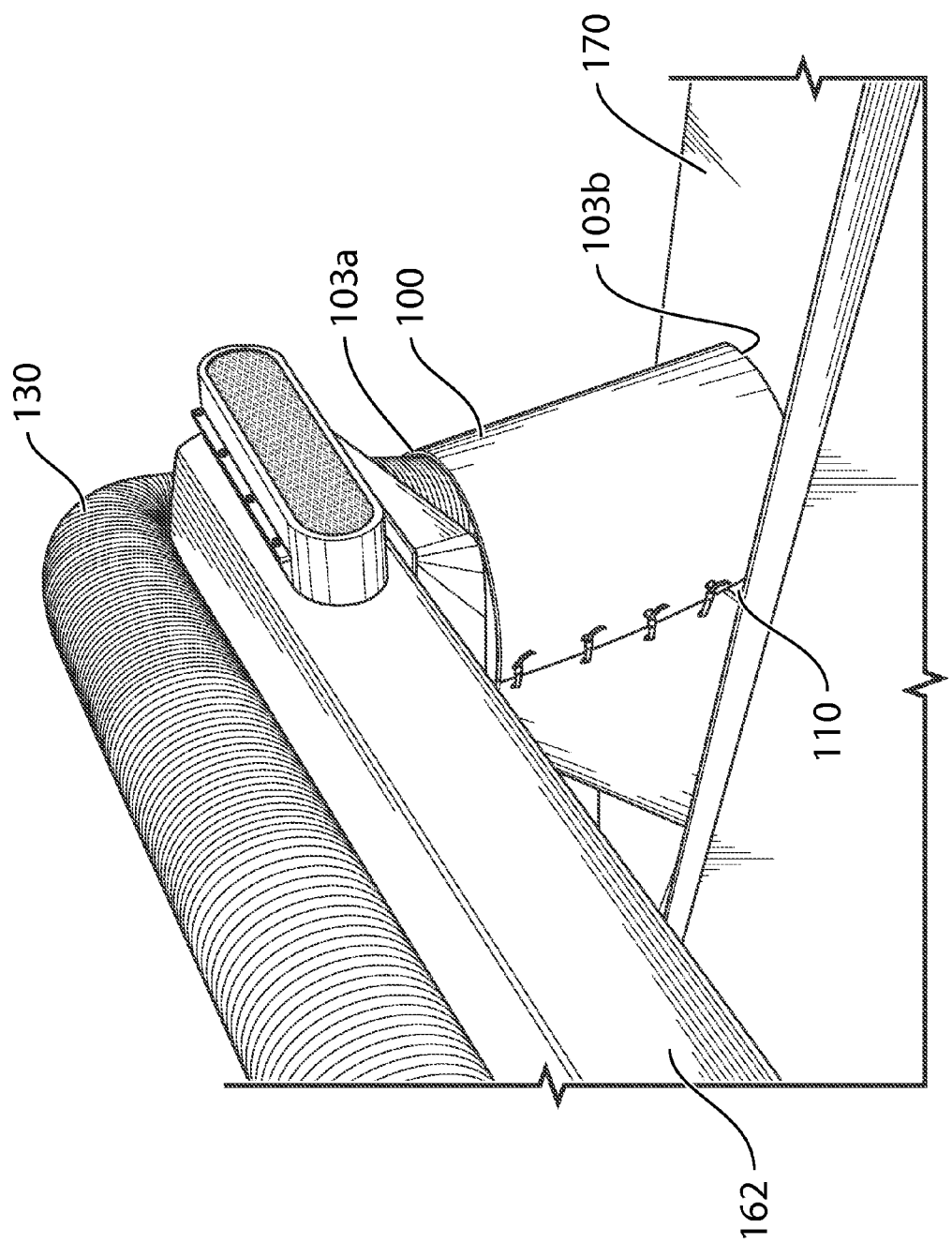
FIG. 4 is a perspective view of a preferred exemplary nose cone with a viewing window, the nose cone in substantially sealed association with a tail spout of a sand handler and a vacuum hose of a vacuum system.
Figure 8:
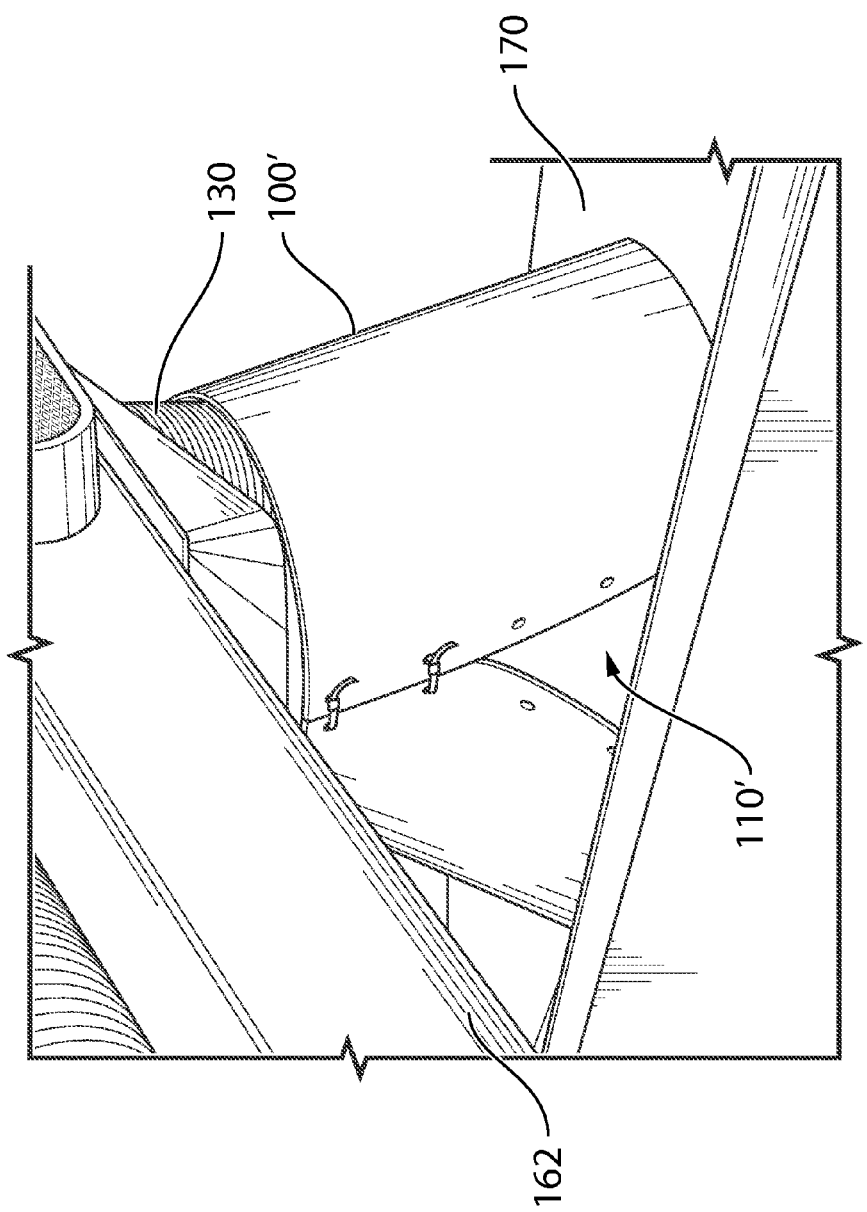
FIG. 8 is an enlarged perspective view of a preferred exemplary nose cone with an alternative enlarged viewing window, the nose cone in substantially sealed association with a tail spout of a sand handler and the vacuum hose of a vacuum system.

By varying the overlap 101 of the first side edge 102c (or at least the first side edge 102c near the upper edge 102a) and the second side edge 102d (or at least the second side edge 102d near the upper edge 102a), the size of the open upper end 103a (including the upper diameter 105a) may be varied and the size and height of the viewing window 110 may be adjusted. FIG. 8, for example, shows an alternative nose cone 100' with a viewing window 110' that is larger than the viewing window 110 of FIG. 4.

The material sheet is preferably wrapped around a tail spout 120 (of a tail of a sand handler) and a vacuum hose 130 (or at least the vacuum entrance end of the hose 130 of a vacuum system) to form the nose cone 100. By varying the overlap 101 of at least the first side edge 102c near the upper edge 102a and at least the second side edge 102d near the upper edge 102a, the size of the open upper end 103a (including the upper diameter 105a) may be varied to accommodate different combinations and configurations of tail spouts (of different sizes and shapes) and vacuum hoses (of different sizes and shapes).

The material sheet is preferably semitransparent or transparent. This allows ample light in and may permit operators to view sand 150 levels through the material of the nose cone 100 even if they cannot see through the viewing window 110 from a particular angle. Preferred material sheets are plastic. An exemplary preferred material sheet is ten (10) millimeter polyethylene sheeting (poly). An exemplary preferred material sheet is made from inexpensive disposable material. It should be noted that alternative uses may necessitate the use of material sheets of alternative materials or thickness.

FIG. 9 uses reference numbers 104a-d to show exemplary positions of exemplary attachment mechanisms including, but not limited to, cable ties (e.g. zip ties), fasteners (e.g. magnets), adjustable connectors (e.g. elastic or rubber), and/or adhesive (e.g. duct tape). Reference numbers 104a-d may be virtual (not shown, but known by the installer) placements, printed placements, and/or actual placements. Attachment mechanisms at positions 104a are shown as being positioned along the second side edge 102d. Attachment mechanisms at positions 104b-c are shown as being positioned at angles between the upper edge 102a and the first side edge 102c. The two lines of attachment mechanisms positions 104*b-c* may be used separately with the line of attachment mechanisms at positions 104*a*. Specifically, the line of attachment mechanisms at positions 104*b* may be used with the line of attachment mechanisms at positions 104*a* to secure the sheet around a relatively large circumference of the tail spout 120 and the vacuum hose 130. On the other hand, the line of attachment mechanisms at positions 104*c* (shown in phantom to designate that a second line of attachment mechanisms would be optional) may be used with the line of attachment mechanisms at positions 104*a* to secure the sheet around a relatively small circumference of the tail spout 120 and the vacuum hose 130.

As mentioned, the nose cone 100 may be adjustable and/or adaptable in the field. Dashed lines 106*a-d* may be virtual lines (known by the installer who trims "freehand"), printed lines, and/or perforated lines. The installer may trim (e.g. cut or tear) along one or more of the lines 106*a-d* to adjust or adapt the nose cone 100 in the field. Trimming along dashed lines 106*a-b* would reduce the height of the nose cone 100. Trimming along dashed lines 106*c-d* would reduce excess material of the nose cone 100.

Although only showed with a single window (the viewing window 110), additional windows may be cut out of the sheet material for additional viewing functionality.

FIG. 11 shows an alternative nose cone 100" material sheet that has an upper edge 102*a"*, a lower edge 102*b"*, a first side edge 102*c"*, and a second side edge 102*d"*. The properties of the material sheet of FIG. 9 and elements shown and described in relationship thereto may be used in combination with and/or in place of those discussed here. One or both of the bottom corners (formed between the lower edge 102*b"* and one or both of the side edges 102*c"* and 102*d"*) may be notched or angled such that when the material sheet is wrapped the window is formed by the notch(es) or angle(s). FIG. 11 uses reference numbers 104*a"-d"* to show exemplary positions of exemplary attachment mechanisms including, but not limited to, cable ties (e.g. zip ties), fasteners (e.g. magnets), adjustable connectors (e.g. elastic or rubber), and/or adhesives (e.g. duct tape). Reference numbers 104*a"-d"* may be virtual (not shown, but known by the installer) placements, printed placements, and/or actual placements. Dashed lines 106*a"-d"* may be virtual lines (known by the installer who trims "freehand"), printed lines, and/or perforated lines. The installer may trim (e.g. cut or tear) along one or more of the lines 106*a"-d"* to adjust or adapt the nose cone 100" in the field. The material sheet of FIG. 11 is meant to be exemplary but alternative sizes and shapes are included. For example, the height (between the upper edge 102*a"* and the lower edge 102*b"*) would be increased if a longer drop is (the distance between the tail and the hopper 170) anticipated. The material sheets may be custom made for a particular installation, adjustable, and/or adaptable in the field.

The dimensions of the material sheet and/or the extent of the wrapping (overlap) is determined, at least in part, to provide negative pressure within the nose cone so that dust does not escape through the opening. Put another way, the suction from the vacuum system (via the vacuum hose) and the internal volume of the nose cone are balanced so that the suction is sufficient to keep the dust within the nose cone without sucking the material sheet into the vacuum hose. The amount of suction and the internal volume may be determined using mathematical formulas and/or experimentation. Other factors which would effect the amount of suction and the internal volume include, but are not limited to, the amount of dust produced, the type of dust, the type (e.g. weight) of the material sheet, whether there are weights (e.g. weights 112) on the nose cone, external environment (e.g. temperature, wind, rain), and the size (and quantity) of the window(s).

Attachment mechanisms (referred to generally as 108) including, but not limited to, cable ties (e.g. zip ties 108*a* in FIG. 5), fasteners (e.g. magnets 108*b* in FIG. 6), adjustable connectors (e.g. elastic and rubber, not shown), and/or adhesives (e.g. duct tape 108*c* in FIG. 7) are used to both secure the material sheet in its overlapped position and to secure the nose cone 100 to the tail spout 120. To secure the material sheet in its overlapped position, the attachment mechanisms 108 are positioned at and/or near the overlap 101. To secure the nose cone 100 to the tail spout 120, the attachment mechanisms 108 are positioned at and/or near the open upper end 103*a* and the upper edge 102*a*.

Installation:

The top of the nose cone 100 may be secured to the bottom of the tail spout 120 or just above the bottom of the tail spout 120. Some tail spouts have a rotating component (not shown) that would not be affected by the nose cone 100 in either position. Put another way, both the regular tail spout 120 and tail spouts with a rotating component could be used without affecting the material sheet of the nose cone 100.

Figure 5:
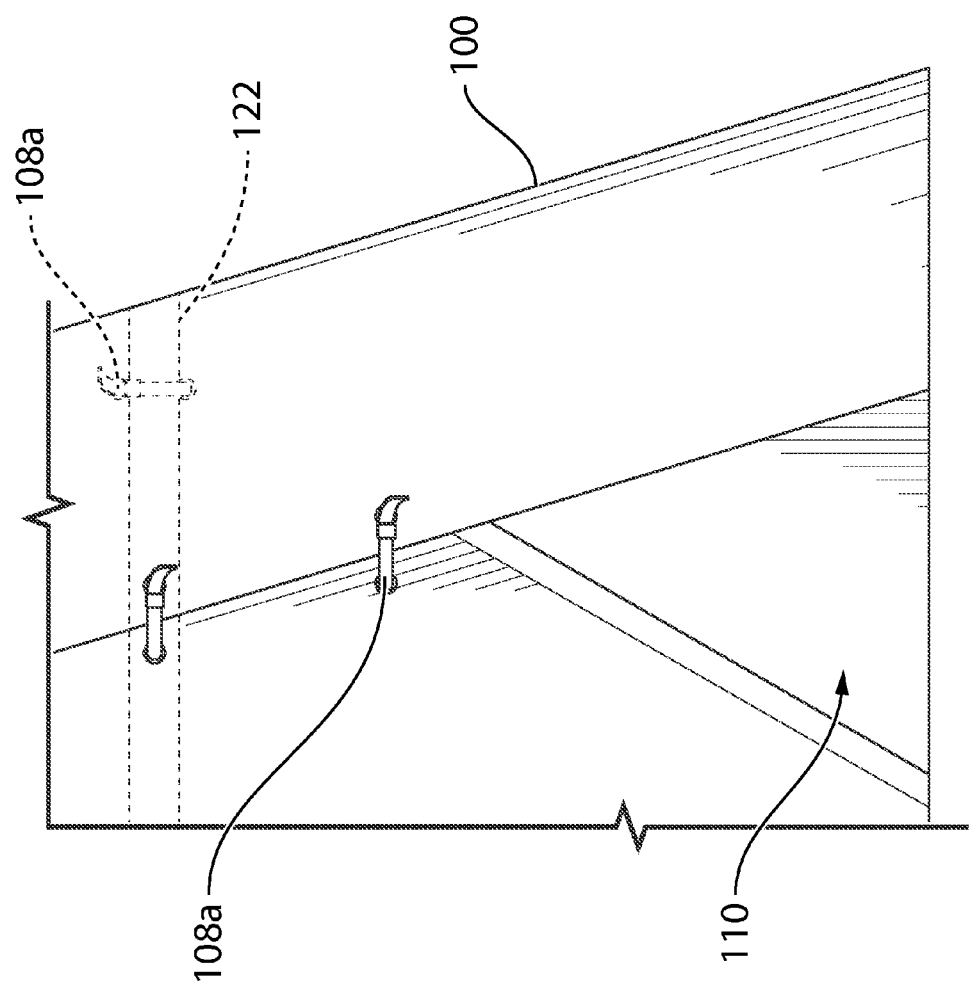
FIG. 5 is an enlarged side view of a preferred exemplary nose cone with a viewing window, cable ties attaching the nose cone to a tail spout (the lip of which is shown in phantom) and vacuum hose system (not shown).
Figure 6:
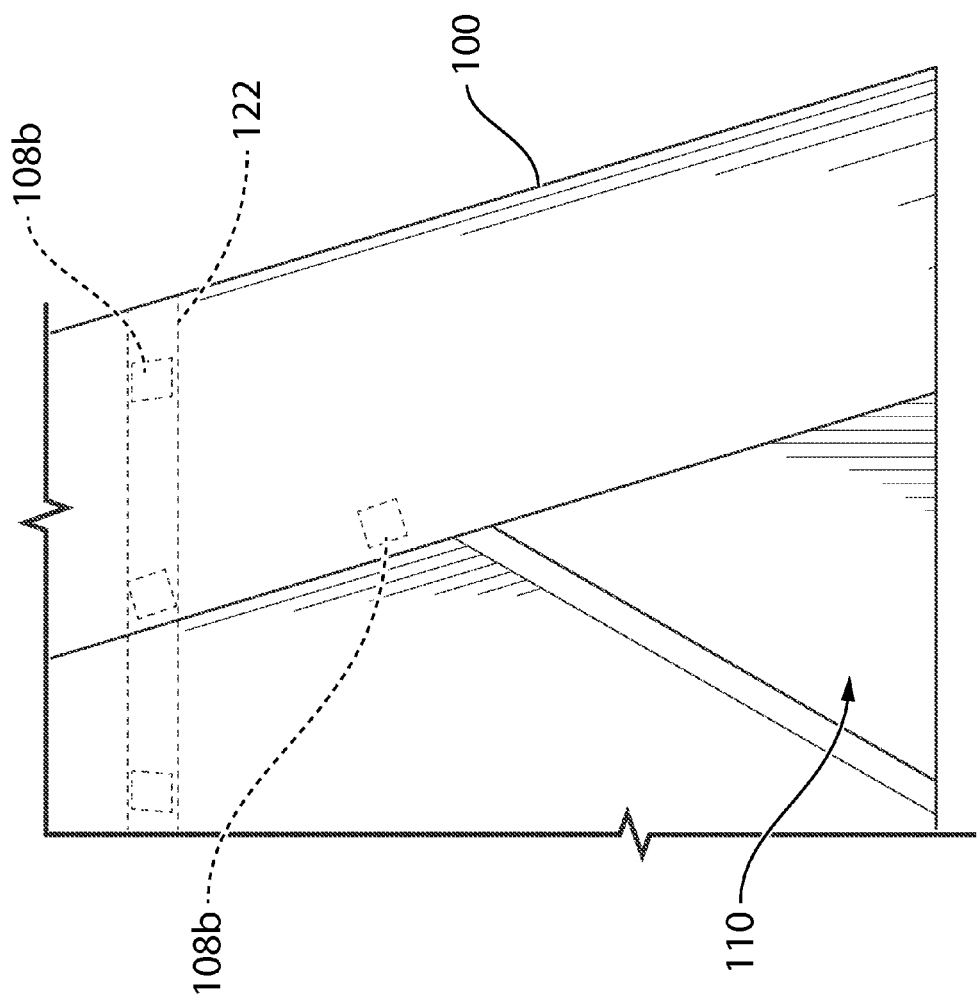
FIG. 6 is an enlarged side view of a preferred exemplary nose cone with a viewing window, fasteners (e.g. magnets) attaching the nose cone to a tail spout (the lip of which is shown in phantom) and vacuum hose system (not shown).
Figure 7:
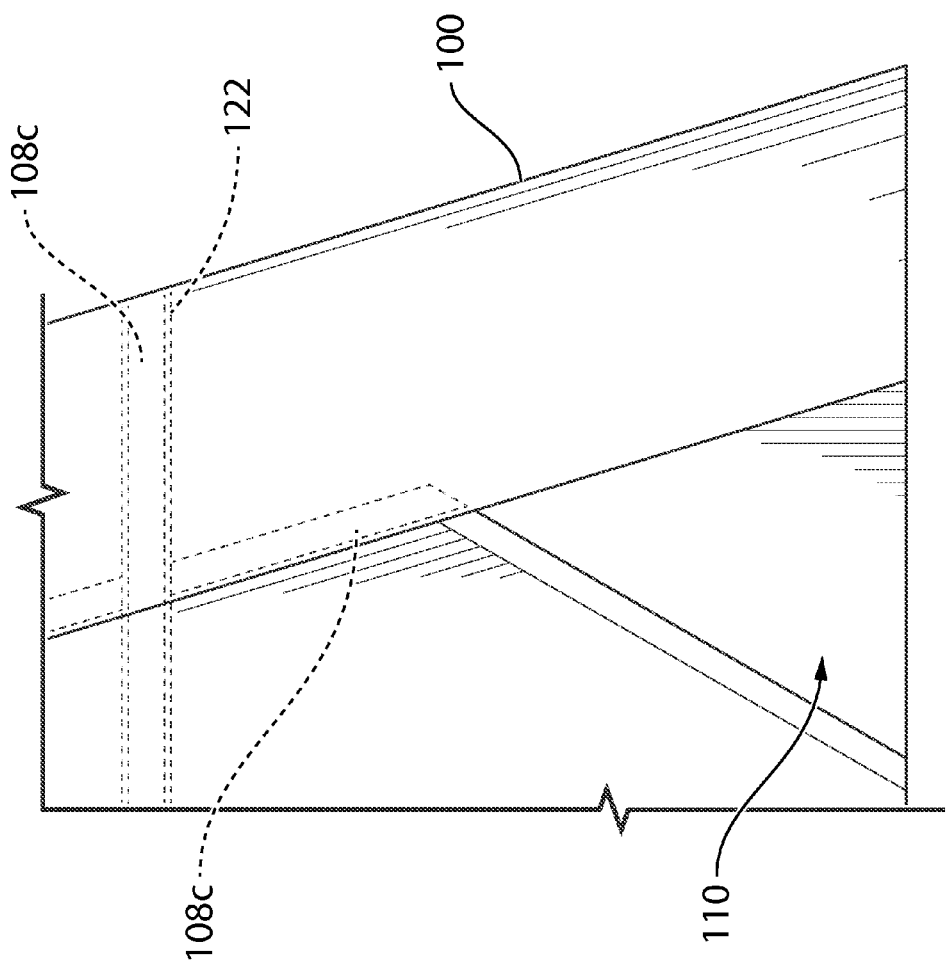
FIG. 7 is an enlarged side view of a preferred exemplary nose cone with a viewing window, adhesive (e.g. duct tape) attaching the nose cone to a tail spout (the lip of which is shown in phantom) and vacuum hose system (not shown).

The nose cone 100 can be attached (and preferably "sealed tightly") to the combined circumference of the tail spout 120 and the vacuum hose 130 using attachment mechanisms (referred to generally as 108, which may be positioned at 104*a-d* of FIG. 9) including, but not limited to, cable ties (e.g. zip ties 108*a* in FIG. 5), fasteners (e.g. magnets 108*b* in FIG. 6), adjustable connectors (e.g. elastic or rubber, not shown), and/or adhesives (e.g. duct tape 108*c* in FIG. 7). One type of preferred attachment is the attachment created by wrapping the open upper end 103*a* of the material sheet securely around the combined circumference of the tail spout 120 and the vacuum hose 130. Once the first side edge 102*c* is overlapped with the second side edge 102*d* to form the correctly sized open upper end 103*a*, the side edges 102*c-d* are secured together using the attachment mechanisms 108 positioned, for example, at positions 104*a* and 104*b* and/or at positions 104*a* and 104*c*. Another type of preferred attachment is the attachment created by using attachment mechanisms 108 (or a combination of attachment mechanisms) to attach the nose cone 100 to the exterior circumference of the combined tail spout 120 and vacuum hose 130. This may be done by attaching the upper edge 102*a* of the material sheet (at positions such as positions 104*d*) to the tail attachment structure 122. The tail attachment structure 122 may, for example, be an annular lip, an annular ring (secured by set screws, bolts, or welding), or individual attachment devices (e.g. loops, holes, hooks). The cylindrical ribbed surface of the vacuum hose 130 may also help hold the upper edge 102*a* of the material sheet of nose cone 100 in place. FIG. 5 shows cable ties (e.g. zip ties 108*a*) attaching the upper edge 102*a* of the nose cone 100 to the tail attachment structure 122. FIG. 6 shows fasteners (e.g. magnets 108*b*) attaching the upper edge 102*a* of the nose cone 100 to the tail attachment structure 122. FIG. 7 shows adhesives (e.g. duct tape 108*c*) attaching the upper edge 102*a* of the nose cone 100 to the tail attachment structure 122.

When the nose cone 100 is attached (and preferably "sealed tightly") to the combined circumference of the tail spout 120 and the vacuum hose 130, the vacuum hose 130 (or a hose attachment (not shown)) is positioned between the material sheet and the tail spout 120. Once in position and attached thereto, the upper edge of the material sheet is "sealed tightly" around the joint exterior circumference of the tail spout 120 and the vacuum hose 130. The phrase "sealed tightly" is meant to describe an association that is secure and relatively close thereto. Appropriate sealing means (e.g. foam and rubber) may be used to further seal the nose cone 100 to the combined circumference of the tail spout 120 and the vacuum hose 130.

When the nose cone 100 is wrapped around and secured to the combined circumference of the tail spout 120 and the vacuum hose 130, the base of the material sheet is shown as not forming a complete circle, thereby creating an opening for viewing (viewing window 110) between the lower portions of the side edges 102*c*, 102*d*. The viewing window 110 is shown as generally triangular. Varying the overlap 101 at the top of the nose cone 100, allows the adjustment of the size and height of the viewing window 110. It should be noted that because the vacuum hose 130 is positioned generally near the tail spout 120, most of the dust 140 is vacuumed from the space within the nose cone 100 almost immediately. The material sheet of the nose cone 100 holds the remainder of the dust 140 to provide additional opportunity for the vacuum system to inhale the dust 140. The shown preferred positioning of the viewing window 110 relatively distal from the opening of the vacuum hose 130 would tend to draw the dust 140 away from the viewing window 110. Thus, in practice, very little dust 140 escapes from the viewing window 110. And the size of the viewing window 110 can be adjusted such that the amount of dust 140 that does escape is within acceptable limits.

The bottom lower edge 102*b* of the material sheet does not need to extend fully to the next surface (e.g. the top of the hopper 170), but may leave several inches of gap, as the pile of sand 150 may be high enough to fill the gap. The bottom lower edge 102*b* may be left several inches too long as well to allow for later height adjustment of the tail. This can also be used to prevent wind issues, as sand 150 will naturally weigh down the lower edge 102*b* of the material sheet if it is left a little long. The sand 150 on the excess material sheet will keep the material sheet in place. As shown in FIG. 10, weights 112 (e.g. magnets) can also be used along the bottom lower edge 102*b* to prevent undesirable movement from wind.

The material sheet can be double wrapped (folded, with the upper fold forming the upper edge 102*a* and the two "loose" edges forming the lower edge 102*b*) for extra durability. Put another way, if the material sheet is double wrapped, the cross section would be an upside-down "U" or "V," the fold forming the apex of the "U" or "V." The double wrap is preferably horizontal rather than vertical to allow for trimming along the bottom lower edge 102*b* (e.g. along dashed lines 106*c-d*) of the material sheet.

Each tail is individually tied into the vacuum system through a vacuum hose 130. This can be done very basically with a vacuum hose 130 stuck into the material sheet (sometimes flattened to help prevent leakage around a circular vacuum hose 130, or a special attachment can be made to be mounted (possibly semi-permanently or permanently) to the end of the tail. This would allow easy connecting/disconnecting of the vacuum hose 130, would prevent dust 140 loss, and would maintain a cross-sectional area similar to the vacuum hose 130 therefore allowing the maximum volume of air to be captured.

Method for Containing Dust:

The nose cone 100 described above may be used in a method for containing respirable and/or inhalable particles (dust 140) created in an industrial process. The method includes the step of creating a nose cone using a material sheet having an upper edge, a lower edge, a first side edge, and a second side edge, creating the nose cone by wrapping (preferably conically) the first side edge of the material sheet to at least partially overlap the second side edge of the material sheet to form an overlap therebetween, to form an open upper end of the nose cone from at least part of the upper edge of the material sheet, and to form an open lower end of the nose cone from at least part of the lower edge of the material sheet. The upper edge of the material sheet is preferably wrapped around an outer joint circumference of both the tail spout and the vacuum hose. The method also preferably includes the step of forming a viewing window is formed between a lower portion of the first side edge of the material sheet and a lower portion of the second side edge of the material sheet. Still further, the method also preferably includes the step of securing the material sheet at or near the overlap using attachment mechanisms. Finally, the method preferably includes the step of securing the open upper end of the nose cone with a tail spout and a vacuum hose to contain respirable and/or inhalable particles created in an industrial process. Preferably, the open upper end of the nose cone is secured to the tail spout and the vacuum hose using attachment mechanisms selected from the group consisting of cable ties, fasteners, adjustable connectors, and adhesives. The open lower end of the nose cone may be trimmed. At least one additional window may be cut in the material sheet of the nose cone.

Advantages:

One of the benefits of using individual nose cones 100 is a much more efficient and effective method of containing the dust 140 than a large tent structure. Larger area enclosures are rather ineffective, and work poorly in cooperation with vacuum technologies, as even a high volume vacuum hose 130 does not actively draw air from very far away. Depending on rates and setup, dust even as close as 2-3 feet away from a 12-inch vacuum hose 130 running off a 20'000 CFM unit may not be captured. So having enclosures that create spaces larger than indicated above is not practical. Keeping each individual sand transfer point in close, contained proximity to the vacuum hose 130 is a critical advantage of the nose cone 100.

The viewing window 110 created by forming a cone shape gives operators an excellent viewing space. This is made possible because the nose cone's smaller volume maintains a negative pressure more effectively than a tent, thereby allowing for an opening that does not excessively leak dust. Another key feature of the nose cone 100 is the use of a transparent material to allow ample light in and to permit operators to view sand 150 levels through the nose cone 100. This makes the system safer by preventing the need to enter a silica dust zone because the operators can readily see inside.

Another safety improvement is the nose cone 100 would not qualify as a confined space. The tenting structures are not only confined spaces that operators may need to enter, but the tenting structures create an unacceptably high silica dust exposure risk for anyone who enters the tenting structures. This high exposure risk is prevented with the small nose cone design.

Secondary exposure to silica dust 140 can also be prevented with the nose cone 100. Currently, disposing of the tarps and equipment to build the tenting structures is prohibitively expensive. As a result, workers performing the more time consuming process of building the tenting structures are also exposed to residual silica dust 140 that collects on the interior of the tenting structures. The nose cone 100 is preferably made from a disposable material sheet rather than expensive tarps, lessening this secondary exposure risk.

The smaller surface design of the nose cone 100 makes the nose cone 100 less prone to wind damage. Further, the smaller surface design of the nose cone 100 also allows untrained personnel to make adjustments. Occasionally a situation will come up where an operator needs to remove the nose cone 100, or possibly change the position of the tail, and he will be able make those changes himself. Adjusting the rigid, fixed tenting structure is more difficult and potential problems, for example, the tenting structure might get in the way if the tail needs to be lowered, may be encountered. The nose cone 100 does not get in the way if the tail needs to be lowered, and, further, the nose cone 100 can be trimmed along the bottom with a knife or scissors if so desired. Some slack can also be left in the nose cone setup so if the tail needs to be raised, the nose cone 100 still provides the necessary containment function without leaving gaps. Currently there is no method of doing this with tenting structures.

The nose cone 100 would reduce the number of vacuum hoses lying on the ground as they so often are with the tenting structures. Less vacuum hoses lying on the ground would decrease the risk to workers from a tripping hazard, and also prevent ground water in the form of puddles from accidentally being sucked up into the vacuum hose 130 and damaging the filters.

An attachment can be added to prevent the material sheet from being sucked into the vacuum hose 130. A vortex chamber for removing solids, or a tight angle bend which would remove heavier particles, could be included to remove sand 150 before it reached the filter housing. The nose cone 100 does not require a handling mechanism 160 (e.g. a transfer belt) when used for jobs where the tail pours directly into a hopper 170.

The nose cone 100 would work with a permanently attached vacuum hose extension. The extension may be a fixed ducting (e.g. an aluminum duct) that is attached above or below the tail. Although a separate component, the extension most likely would function similarly to the vacuum hose 130 described herein and is, in fact, just a different type of hose. The vacuum hose extension could have mounting surfaces or structure (similar to the tail attachment structure 122) to which the nose cone 100 may be removably or permanently attached. A permanently attached vacuum hose extension would create a time savings over existing systems that must be removed after each job (sometimes more than once daily) because they cannot travel down roads while attached. Furthermore, the vacuum hose extension can be extended to run the length of the tail (either on top of the tail if the vacuum hose is thin enough to not impede raising the tail and/or or below the tail if the hose doesn't interfere with operations of the tail) which allows operators to attach a vacuum hose 130 from near ground level. This creates a time savings, but, more importantly, is also a safer option because it does not require climbing onto the tail.

It is to be understood that the inventions, examples, and embodiments described herein are not limited to particularly exemplified materials, methods, and/or structures. It is to be understood that the inventions, examples, and embodiments described herein are to be considered preferred inventions, examples, and embodiments whether specifically identified as such or not. The shown inventions, examples, and embodiments are preferred, but are not meant to be limiting unless specifically claimed, in which case they may limit the scope of that particular claim.

All references (including, but not limited to, foreign and/or domestic publications, patents, and patent applications) cited herein, whether supra or infra, are hereby incorporated by reference in their entirety.

The terms and expressions that have been employed in the foregoing specification are used as terms of description and not of limitation, and are not intended to exclude equivalents of the features shown and described. While the above is a complete description of selected embodiments of the present invention, it is possible to practice the invention using various alternatives, modifications, adaptations, variations, and/or combinations and their equivalents. It will be appreciated by those of ordinary skill in the art that any arrangement that is calculated to achieve the same purpose may be substituted for the specific embodiment shown. It is also to be understood that the following claims are intended to cover all of the generic and specific features of the invention herein described and all statements of the scope of the invention that, as a matter of language, might be said to fall therebetween.

What is claimed is:

1. A nose cone associatable with a tail spout of a sand handler and a vacuum hose of a vacuum system, said nose cone comprising:
    (a) a material sheet that has an upper edge, a lower edge, a first side edge, and a second side edge;
    (b) said first side edge of said material sheet at least partially overlapping said second side edge of said material sheet to form an overlap therebetween, at least part of said upper edge of said material sheet forming an open upper end of said nose cone, and at least part of said lower edge of said material sheet forming an open lower end of said nose cone;
    (c) a viewing window is formed between a lower portion of said first side edge of said material sheet and a lower portion of said second side edge of said material sheet; and
    (d) at least one attachment mechanism securing said material sheet at or near said overlap;
    (e) wherein said open upper end of said nose cone is associatable with said tail spout and said vacuum hose to contain respirable and/or inhalable particles created in an industrial process.

2. The nose cone of claim 1, said material sheet is wrapped conically.

3. The nose cone of claim 1, said open upper end having an upper diameter and said open lower end having a lower diameter, said upper diameter being smaller than said lower diameter.

4. The nose cone of claim 1, said material sheet being at least semitransparent.

5. The nose cone of claim 1, said material sheet being transparent.

6. The nose cone of claim 1, said material sheet being disposable.

7. The nose cone of claim 1, said at least one attachment mechanism selected from the group consisting of cable ties, fasteners, adjustable connectors, and adhesives.

8. A nose cone associatable with a tail spout of a sand handler and a vacuum hose of a vacuum system, said nose cone comprising:
    (a) an at least semitransparent material sheet that has an upper edge, a lower edge, a first side edge, and a second side edge, said material sheet wrapped to form a cone;
    (b) said first side edge of said material sheet at least partially overlapping said second side edge of said material sheet to form an overlap therebetween, at least part of said upper edge of said material sheet forming an open upper end of said nose cone, and at least part of said lower edge of said material sheet forming an open lower end of said nose cone;
    (c) said open upper end having an upper diameter and said open lower end having a lower diameter, said upper diameter being smaller than said lower diameter;
    (d) a generally triangular viewing window is formed between a lower portion of said first side edge of said material sheet and a lower portion of said second side edge of said material sheet; and (e) at least one attachment mechanism securing said material sheet at or near said overlap;

(f) wherein said open upper end of said nose cone is substantially sealable with said tail spout and said vacuum hose to contain respirable and/or inhalable particles created in an industrial process.

9. The nose cone of claim 8, said material sheet being transparent.

10. The nose cone of claim 8, said material sheet being disposable.

11. The nose cone of claim 8, said at least one attachment mechanism selected from the group consisting of cable ties, fasteners, adjustable connectors, and adhesives.

12. A method for containing respirable and/or inhalable particles created in an industrial process, said method comprising the steps of:

(a) creating a nose cone using a material sheet having an upper edge, a lower edge, a first side edge, and a second side edge, creating said nose cone by wrapping said first side edge of said material sheet to at least partially overlap said second side edge of said material sheet to form an overlap therebetween, to form an open upper end of said nose cone from at least part of said upper edge of said material sheet, and to form an open lower end of said nose cone from at least part of said lower edge of said material sheet;

(c) forming a viewing window between a lower portion of said first side edge of said material sheet and a lower portion of said second side edge of said material sheet;

(d) securing said material sheet at or near said overlap using attachment mechanisms; and (e) securing said open upper end of said nose cone with a tail spout and a vacuum hose to contain respirable and/or inhalable particles created in an industrial process.

13. The method of claim 12, said step of creating a nose cone further comprising the step of conically wrapping said first side edge of said material sheet to at least partially overlap said second side edge of said material sheet to form said overlap therebetween.

14. The method of claim 12, said step of creating a nose cone further comprising the step of wrapping said upper edge of said material sheet around an outer joint circumference of both said tail spout and said vacuum hose.

15. The method of claim 12, said step of creating a nose cone further comprising the step of wrapping said upper edge of said material sheet so that said open upper end has an upper diameter and said open lower end has a lower diameter, said upper diameter being smaller than said lower diameter.

16. The method of claim 12, said step of securing said open upper end of said nose cone further comprising the step of securing said open upper end of said nose cone with said tail spout and said vacuum hose using at least one attachment mechanism selected from the group consisting of cable ties, fasteners, adjustable connectors, and adhesives.

17. The method of claim 12, further comprising the step of trimming said open lower end of said nose cone.

18. The method of claim 12, further comprising the step of cutting at least one additional window in said material sheet of said nose cone.

\* \* \* \* \*